US012639239B2

(12) United States Patent
Lee et al.

(10) Patent No.: US 12,639,239 B2
(45) Date of Patent: May 26, 2026

(54) MEMORY SYSTEM AND METHOD FOR OPERATING MEMORY SYSTEM

(71) Applicant: SAMSUNG ELECTRONICS CO., LTD., Suwon-si (KR)

(72) Inventors: Daeyeong Lee, Suwon-si (KR); Bumgyu Park, Suwon-si (KR); Jong-Lae Park, Suwon-si (KR); Min-Young Joe, Suwon-si (KR); Eunok Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/104,414

(22) Filed: Feb. 1, 2023

(65) Prior Publication Data

US 2024/0061794 A1 Feb. 22, 2024

(30) Foreign Application Priority Data

Aug. 16, 2022 (KR) ........................ 10-2022-0102064

(51) Int. Cl.
*G06F 13/16* (2006.01)
*G06F 12/02* (2006.01)
*G06F 12/0817* (2016.01)

(52) U.S. Cl.
CPC ...... *G06F 13/1684* (2013.01); *G06F 12/0238* (2013.01); *G06F 12/0822* (2013.01)

(58) Field of Classification Search
CPC ............. G06F 13/1684; G06F 12/0238; G06F 12/0822

USPC .......................................................... 711/154
See application file for complete search history.

(56) References Cited

U.S. PATENT DOCUMENTS

| | | | | |
|---|---|---|---|---|
| 5,893,144 A | * | 4/1999 | Wood .................. | G06F 12/0811 |
| | | | | 711/119 |
| 7,996,630 B2 | | 8/2011 | Yim et al. | |
| 9,158,702 B2 | | 10/2015 | Hughes et al. | |
| 10,355,975 B2 | | 7/2019 | Sebexen et al. | |
| 10,817,422 B2 | | 10/2020 | Jayasena et al. | |
| 11,249,657 B2 | | 2/2022 | Hinds et al. | |
| 2003/0196039 A1 | * | 10/2003 | Chen .................. | G06F 12/0848 |
| | | | | 712/E9.055 |
| 2004/0199752 A1 | * | 10/2004 | Winberg ................. | G06F 9/383 |
| | | | | 712/225 |
| 2006/0080372 A1 | * | 4/2006 | Barua ................... | G06F 9/5016 |
| 2014/0189247 A1 | * | 7/2014 | Hughes ................. | G06F 12/123 |
| | | | | 711/136 |
| 2016/0246726 A1 | * | 8/2016 | Hahn .................... | G06F 3/0613 |
| 2019/0179629 A1 | * | 6/2019 | Roy ........................ | H03M 7/30 |

(Continued)

FOREIGN PATENT DOCUMENTS

KR 1957855 B1 3/2019

*Primary Examiner* — Jared I Rutz
*Assistant Examiner* — Wei Ma
(74) *Attorney, Agent, or Firm* — Fish & Richardson P.C.

(57) ABSTRACT

The memory system may include a processor; a scratch pad memory connected to the processor through an internal bus, a memory controller connected to the processor through the internal bus, and configured to access a memory device through an external bus in response to a memory access request by the processor; and a hint managing module configured to manage a hint for selecting data to be overridden on the scratch pad memory from among data loaded in the memory device.

20 Claims, 9 Drawing Sheets

1

(56) References Cited

U.S. PATENT DOCUMENTS

| | | | |
|---|---|---|---|
| 2021/0011638 A1* | 1/2021 | Hinds | ................... G06F 3/0659 |
| 2022/0091782 A1 | 3/2022 | Guim Bernat et al. | |

\* cited by examiner

| Average Code Execution Time (usec) | | | |
|---|---|---|---|
| | Base | I$ prefetch | Δ |
| CASE 1 | 29.87 | 30.02 | 0.5% |
| CASE 2 | 14.06 | 12.85 | -8.6% |
| CASE 3 | 10.99 | 10.73 | -2.4% |

FIG. 10

| Instruction Per Cycle | | | |
|---|---|---|---|
| | Base | I$ prefetch | Δ |
| CASE 1 | 0.819 | 0.824 | 0.5% |
| CASE 2 | 1.201 | 1.329 | 10.7% |
| CASE 3 | 1.534 | 1.592 | 3.8% |

MEMORY SYSTEM AND METHOD FOR OPERATING MEMORY SYSTEM

CROSS-REFERENCE TO RELATED APPLICATION

A claim of priority is made to Korean Patent Application No. 10-2022-0102064 filed in the Korean Intellectual Property Office on Aug. 16, 2022, the entire disclosure of which is incorporated herein by reference.

BACKGROUND

Field

The present disclosure relates to a memory system and to a method for operating a memory system.

Description of the Related Art

An operating system is system software for controlling hardware and one or more system resources of a computing system, and providing services for software executed in the computing system. The software executed in the computing system may include application software for providing application services to a user, and primitive software for managing system resources. For example, the primitive software may include an interrupt handler, core power management software, an exception handler, and a scheduler. Primitive software is functionally difference from application software, and it may be difficult to obtain performance improvements when the execution code resides in a cache.

SUMMARY

An embodiment of the present disclosure may provide a memory system for increasing an execution rate by using a scratch pad memory to primitive software that has functional differences from general application software that may increase performance by using a cache, and a method for operating a memory system.

An embodiment of the present disclosure provides a memory system including: a processor; a scratch pad memory connected to the processor through an internal bus; a memory controller connected to the processor through the internal bus, and accessing a memory device through an external bus in response to a memory access request by the processor; and a hint managing module for managing a hint for selecting data to be overridden on the scratch pad memory from among data loaded in the memory device.

The hint managing module may include a hint decision module for analyzing a plurality of code sections defined in the memory device, and provides information on at least one code section determined to be appropriate to be overridden in the scratch pad memory as the hint.

The hint managing module includes a code section decision module for deciding a code section to be overridden in the scratch pad memory based on the hint.

The hint managing module may include an address identification module for identifying a physical address on the decided code section.

The hint managing module may include a scratch pad memory mapping module for duplicating at least one instruction corresponding to the decided code section to the scratch pad memory from the memory device by using the identified physical address.

The scratch pad memory mapping module may map so that the scratch pad memory indicates a code section in the memory device corresponding to the decided code section.

The processor may access data overridden in the scratch pad memory without an intervention of the memory controller.

The hint may be set to select data of which a compulsory cache miss is predicted to be generated beyond a predetermined reference from among the data loaded in the memory device.

The hint may be set to select data of which continuity of a code address is predicted to be given below a predetermined reference from among the data loaded in the memory device.

The hint may be set to select data of which spatial locality is predicted to be given below a predetermined reference from among the data loaded in the memory device.

Another embodiment of the present disclosure provides a memory system including: a memory device including a code section in a predetermined address; a scratch pad memory for receiving and storing a copy of the code section from the memory device; and a processor for prefetching an instruction of the copy stored in the scratch pad memory so as to access the code section according to the predetermined address.

The memory system may further include a cache, wherein the code section included in the memory device may include a first code section and a second code section, the scratch pad memory may receive and store a copy of the first code section, the cache may receive and store a copy of the second code section and may store the same, and the processor may access the scratch pad memory to access the first code section and may access the cache to access the second code section.

The code section included in the memory device may further include a third code section, and the processor may access the scratch pad memory to access the first code section, may access the cache to access the second code section, and may access the memory device to access the third code section.

The processor may be connected to the scratch pad memory and the cache through an internal bus, and the processor may be connected to the memory device through an external bus.

The memory system may further include a hint managing module for managing a hint for selecting data to be duplicated in the scratch pad memory from among data loaded in the memory device.

Another embodiment of the present disclosure provides a method for operating a memory system, including: analyzing a plurality of code sections defined in a memory device, and providing information on at least one code section determined to be appropriate to be overridden in a scratch pad memory as a hint; deciding a code section to be overridden in the scratch pad memory based on the hint; identifying a physical address on the decided code section; duplicating at least one instruction corresponding to the decided code section to the scratch pad memory from the memory device by using the identified physical address; and mapping so that the scratch pad memory indicates a code section in the memory device corresponding to the decided code section.

The method may further include prefetching the at least one instruction stored in the scratch pad memory in order for a processor to access the decided code section.

The hint may be set to select data of which a compulsory cache miss is predicted to be generated for more than a predetermined reference from among data loaded in the memory device.

The hint may be set to select data of which continuity of a code address is predicted to be given below a predetermined reference from among data loaded in the memory device.

The hint may be set to select data of which spatial locality is predicted to be given below a predetermined reference from among data loaded in the memory device.

BRIEF DESCRIPTION OF THE DRAWINGS

FIG. 9 and FIG. 10 are tables for reference in describing effects generated according to embodiments.

DETAILED DESCRIPTION OF THE EMBODIMENTS

Figure 1:
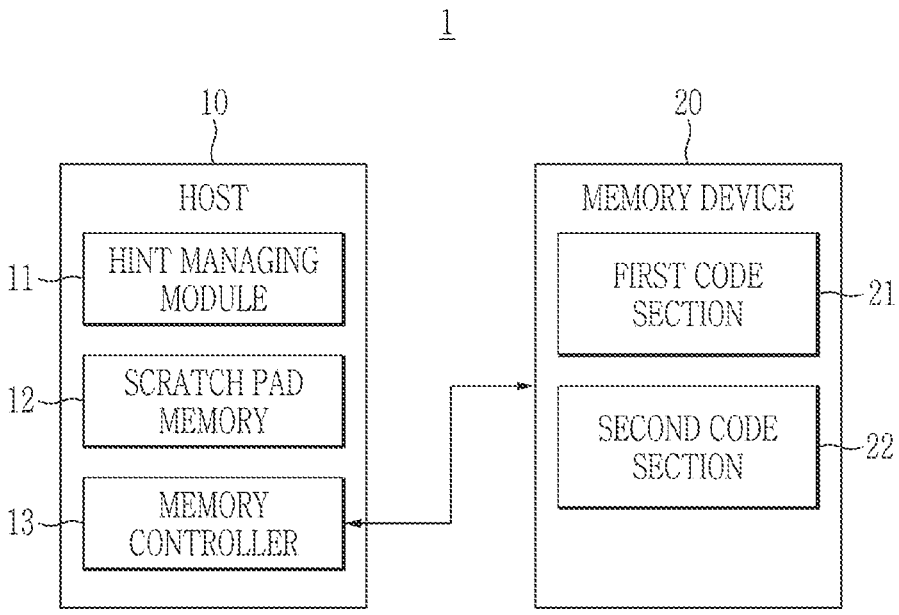
FIG. 1 shows a block diagram of a memory system according to an embodiment.

In the following detailed description, only certain embodiments of the present invention have been shown and described, simply by way of illustration. As those skilled in the art would realize, the described embodiments may be modified in various different ways, all without departing from the spirit or scope of the present inventive concepts.

Accordingly, the drawings and description are to be regarded as illustrative in nature and not restrictive, and like reference numerals designate like elements throughout the specification and drawings.

An expression recited in the singular may be construed as singular or plural unless the expression "one", "single", etc., is used. Terms including ordinal numbers such as first, second, and the like, will be used only to describe various components, and are not to be interpreted as limiting these components. The terms may be only used to differentiate one component from others.

As is traditional in the field of the present disclosure, embodiments may be described, and illustrated in the drawings, in terms of functional blocks, units and/or "modules", Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, in the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 shows a block diagram of a memory system according to an embodiment.

Referring to FIG. 1, the memory system 1 may include a host 10 and a memory device 20.

The host 10 may transmit a memory access request to the memory device 20. The memory access request may include a memory read request and a memory write request. When the host 10 transmits a memory read request to the memory device 20, the memory device 20 may provide data stored in a memory cell to the host 10 in response to the corresponding request. When the host 10 transmits a memory write request on specific data to the memory device 20, the memory device 20 may write the corresponding data to the memory cell in response to the corresponding request.

The host 10 may perform the above-described access to the memory device 20 through the memory controller 13. That is, the memory controller 13 may process the memory access request of the host 10 by receiving the memory access request from the host 10 and controlling or accessing the memory device 20 in response to the request.

The memory device 20 may include a memory cell array including a plurality of memory cells. The memory cell may be a volatile memory cell, and the memory device 20 may be a DRAM (Dynamic Random Access Memory), a SRAM (Static Random Access Memory), a mobile DRAM, a DDR SDRAM (Double Data Rate Synchronous Dynamic Random Access Memory), a LPDDR (Low Power DDR) SDRAM, a GDDR (Graphic DDR) SDRAM, and a RDRAM (Rambus Dynamic Random Access Memory) as unlimited examples. In another embodiment, the memory cell may be a non-volatile memory cell, and the memory device 20 may be an EEPROM (Electrically Erasable Programmable Read-Only Memory), a flash memory, a PRAM (Phase Change Random Access Memory), a RRAM (Resistance Random Access Memory), a NFGM (Nano Floating Gate Memory), a PoRAM (Polymer Random Access Memory), a MRAM (Magnetic Random Access Memory), and a FRAM (Ferroelectric Random Access Memory) as unlimited examples. The memory device 20 will now be described to be the DRAM, and the technical scope of the present disclosure is not limited thereto.

In the present embodiment, code sections 21 and 22 may be defined in the memory device 20. The code sections 21 and 22 may include codes (or code text, programs, instructions, etc.) for executing software having different functional differences. For example, the first code section 21 may include a code on the primitive software for managing the system resource, and the second code section 22 may include a code on the application software for providing application services to the user. Meta data in which codes of which types of software are included in the respective code sections 21 and 22 may be stored and managed in a predesignated position from among the host 10 or the memory device 20.

Here, the different functional differences may include differences among execution patterns of software. For example, the software distinguished as the first code section 21 may have a greater generation possibility of a compulsory cache miss than the software distinguished as the second code section 21. In another way, the software distinguished as the first code section 21 may have lesser continuity of the code address than the software distinguished as the second code section 21. In another way, the software distinguished as the first code section 21 may have a lesser spatial locality than the software distinguished as the second code section 21. Here, a range of the present disclosure is not limited thereto, and the software distinguished as the first code section 21 may be realized in a form that is inappropriate for a general cache structure than the software distinguished as the second code section 21.

The host 10 may further include a hint managing module 11 and a scratch pad memory 12.

The scratch pad memory 12 is generally manufactured with the SRAM, and it may be an on-chip memory device with high rates such as the cache. Differing from the cache, the scratch pad memory 12 may have no hardware for storing data with locality, and differing from the cache accessed by an address mapping, it may have its own address.

The hint managing module 11 may manage hints for selecting data to be overridden to the scratch pad memory 12 from among the data loaded in the memory device 20. That is, the hint may analyze a plurality of code sections defined by the memory device 20, and may include information on at least one code section determined to be appropriate to be overridden in the scratch pad memory 12. For example, from among the code sections 21 and 22, the second code section 22 including a code on the application software for providing an application service to the user may expect improvement of performance by use of the cache, and the first code section 21 including a code on the primitive software for managing the system resource may, when using the cache, have a difficulty in expecting the improvement of performance because of a high frequency of generating the compulsory cache miss, a low continuity of code addresses, or a low spatial locality. In this case, the first code section 21 may be determined to be appropriate to be overridden in the scratch pad memory 912, and the hint may include information on the code sections selected through the reference.

Figure 2:
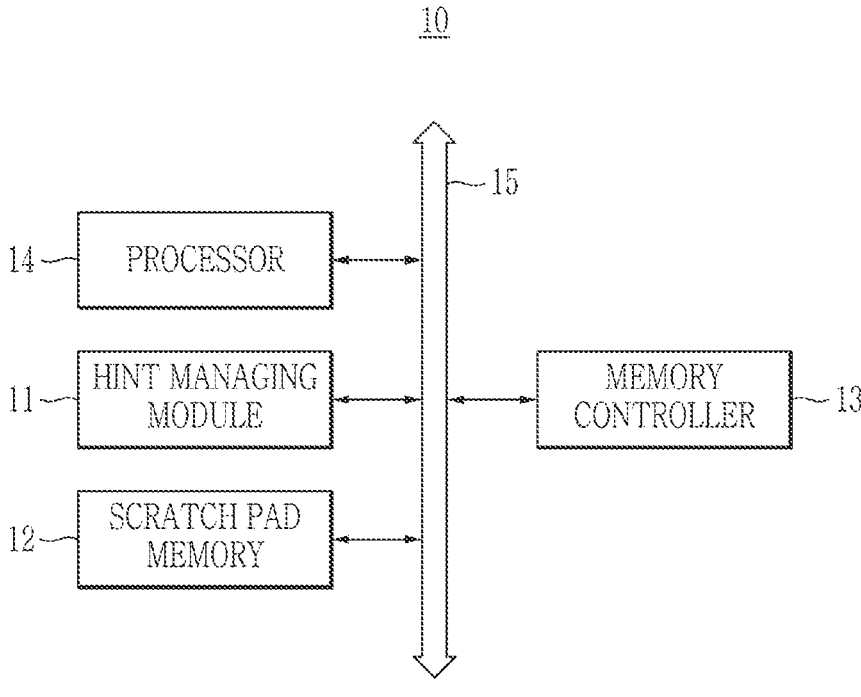
FIG. 2 shows a block diagram of a host of a memory system according to an embodiment.

FIG. 2 shows a block diagram of a host of a memory system according to an embodiment.

Referring to FIG. 2, the host 10 of the memory system may include a hint managing module 11, a scratch pad memory 12, a memory controller 13, and a processor 14. The hint managing module 11, the scratch pad memory 12, the memory controller 13, and the processor 14 may be connected to each other through the internal bus 15 and may transmit/receive data to/from each other. The internal bus 15 may be defined to be a contradistinctive concept for an external bus corresponding to a data transmitting path between the host 10 and another element outside the host 10.

In detail, the scratch pad memory 12 is connected to the processor 14 through the internal bus 15 so that the processor 14 may access the data overridden in the scratch pad memory 12 without an intervention of the memory controller 13. The memory controller 13 may be connected to the processor 14 through the internal bus 15, and may access the memory device 20 through the external bus in response to the memory access request of the processor 14. That is, the processor 14 may access the memory device 20 through the external bus according to the intervention of the memory controller 13.

Figure 3:
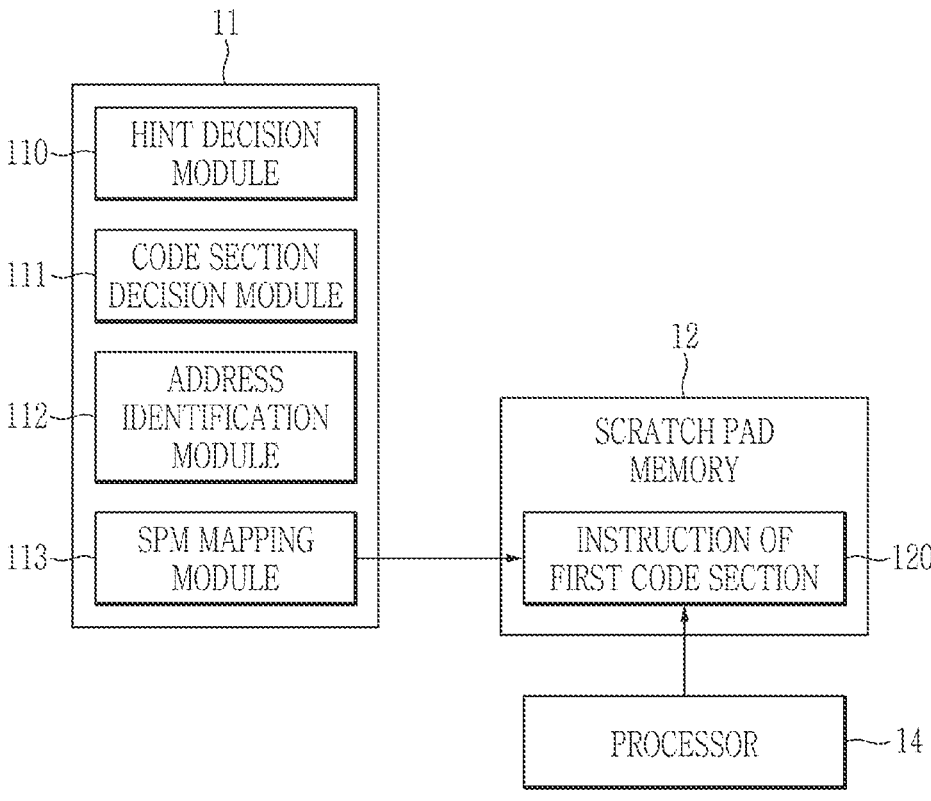
FIG. 3 shows a block diagram for reference in describing an operation of a memory system according to an embodiment.

FIG. 3 shows a block diagram for reference in describing an operation of a memory system according to an embodiment.

Referring to FIG. 3, the hint managing module 11 of the memory system may include a hint decision module 110, a code section decision module 111, an address identification module 112, and a scratch pad memory (SPM) mapping module 113.

The hint decision module 110 may analyze a plurality of code sections defined in the memory device 20, and may provide information on at least one code section determined to be appropriate to be overridden in the scratch pad memory 12 to the code section decision module 111 as a hint. As described above, for example, the hint may include information on the code section that has a difficulty in expecting improvement of performance because of the high frequency of generating the compulsory cache miss when using the cache, the low continuity of the code address, and the low spatial locality. In some embodiments, the hint may be transmitted to the code section decision module 111 through various methods such as memory footprint logging.

The code section decision module 111 may decide the code section to be overridden in the scratch pad memory 12 based on the hint provided by the hint decision module 110. For example, when a plurality of code sections are defined in the memory device 20, and the hint includes information on multiple code sections, the code section decision module 111 may decide the code section that is to be overridden in the scratch pad memory 12 according to the actual execution condition.

The address identification module 112 may identify a physical address on the code section decided by the code section decision module 111. The code section decided to be overridden in the scratch pad memory 12 based on the hint may not be generally known in a compiling stage. For example, when using a KASLR (Kernel Address Space Layout Randomization), the addresses such as a stack, a heap, or a library are disposed in a random region, and are changed each time the system is booted. Therefore, identification may be performed in a way of converting a virtual address of the corresponding code section into a physical address in a runtime stage after the system is booted.

The scratch pad memory mapping module 113 may duplicate at least one instruction 120 corresponding to the code section decided by the code section decision module 111 into the scratch pad memory 12 from the memory device 20 by using the physical address identified by the address identification module 112. In this case, a process for preventing other peripheral devices from accessing the scratch pad memory 12 may be performed. The scratch pad memory mapping module 113 may map so that the scratch pad memory 12 may indicate the code section in the memory device 20 corresponding to the code section decided by the code section decision module 111.

The processor 14 may not request from the memory controller 13, but may access the instruction 120 stored in the scratch pad memory 12 so as to access the code section decided by the code section decision module 111.

According to the present embodiment, the code may have difficulty in expecting improvement of performance because of the high frequency of generating the compulsory cache miss when using the cache, the low continuity of the code address, and the low spatial locality, and when the execution frequency is high in a like way of the primitive software for managing the system resource, the performance may be improved by using the scratch pad memory 12 instead of the cache. In detail, the execution time of the corresponding code may be significantly reduced, an IPC (Instruction Per Cycle) may be increased, a memory access latency may be reduced, and efficiency of power consumption may be increased. For security reasons, the processor 14 may not violate the security policy and may access the instruction stored in the scratch pad memory 12 with a same address by operating the data stored in the scratch pad memory 12 according to an overriding method under a limited condition that the memory address referred to by the executed code may not be randomly changed.

In some embodiments, the method for deciding a hint may be realized in various ways. In detail, the hint may be set to analyze characteristics of the software executed by the processor 14 or the code as quantitative numerical values, and may be set to select the data that are predicted to be advantageous in the improvement of performance when using the scratch pad memory 12 rather than the cache. For example, the hint may be set to select the data in which the compulsory cache miss is predicted to be generated more than a predetermined reference from among the data loaded in the memory device 20. Here, the prediction may be performed by counting the number of generations of the compulsory cache miss to the software or the code executed each time in a same way under a predetermined limited condition, and comparing an expectation of the improvement of performance through the cache and an expectation of the improvement of performance through the scratch pad memory 12 according to statistical methods or predictive methods based on artificial intelligence neural networks. For another example, the hint may be set to select the data in which continuity of the code address is predicted to be less than a predetermined reference from among the data loaded in the memory device 20, and differing from this, it may be set to select the data in which the spatial locality is predicted to be less than a predetermined reference from among the data loaded in the memory device 20.

Figure 4:
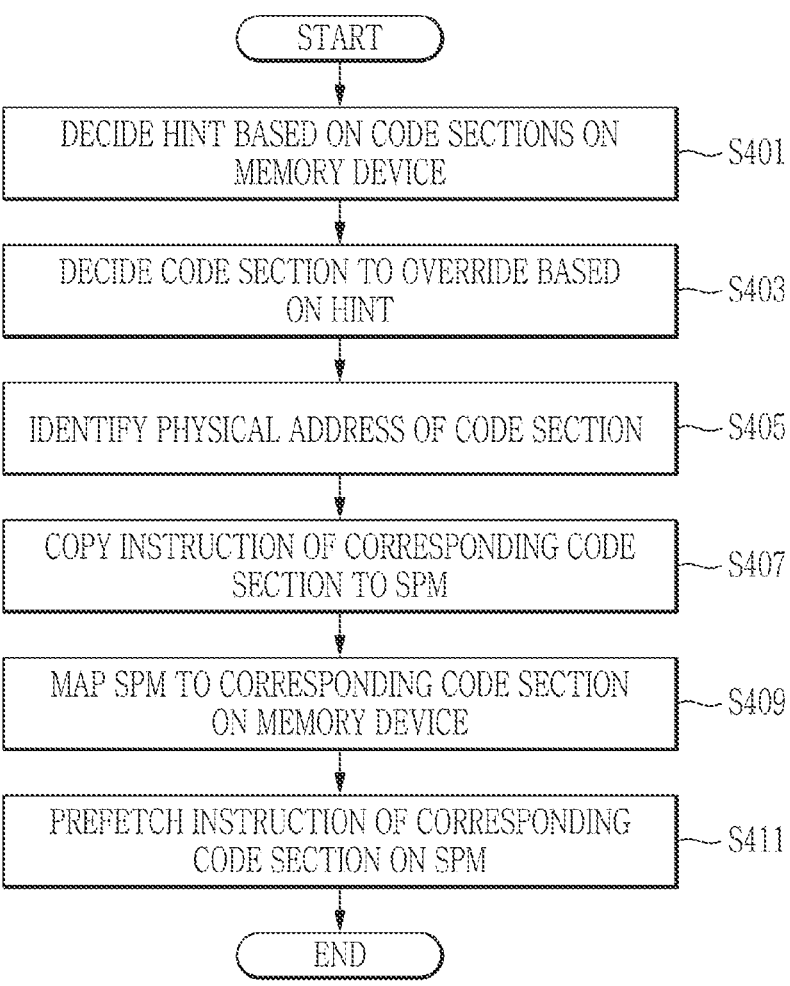
FIG. 4 shows a flowchart for reference in describing a method for operating a memory system according to an embodiment.

FIG. 4 shows a flowchart for reference in describing a method for operating a memory system according to an embodiment.

Referring to FIG. 4, the method for operating a memory system may include analyzing a plurality of code sections defined in the memory device and providing information on at least one code section determined to be appropriate to be overridden in the scratch pad memory as a hint (S401), and deciding the code section to be overridden in the scratch pad memory based on the hint (S403).

The method may include identifying the physical address on the decided code section (S405), and duplicating at least one instruction corresponding to the decided code section to the scratch pad memory from the memory device by using the identified physical address (S407).

The method may include mapping so that the scratch pad memory indicates the code section in the memory device corresponding to the decided code section (S409).

The processor may then prefetch at least one instruction stored in the scratch pad memory to access the decided code section (S411).

A detailed content on the method for operating a memory system according to an embodiment may refer to the content described with reference to FIG. 1 to FIG. 3, so no repeated description will be provided.

Figure 5:
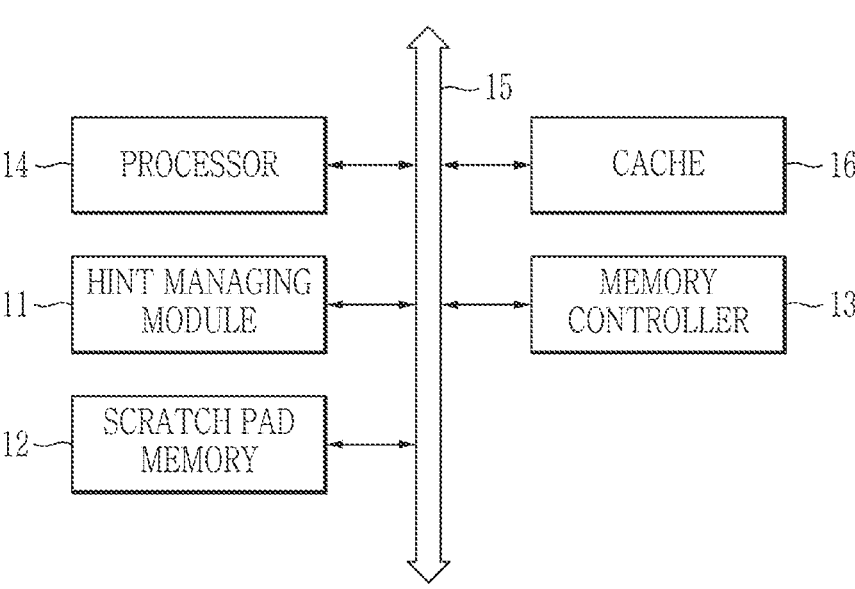
FIG. 5 shows a block diagram of a host of a memory system according to an embodiment.

FIG. 5 shows a block diagram of a host of memory system according to an embodiment.

Referring to FIG. 5, the host 10 of the memory system according to an embodiment may include a hint managing module 11, a scratch pad memory 12, a memory controller 13, a processor 14, and a cache 16. Here, the cache 16 may be connected to the processor 14 through the internal bus 15, and the processor 14 may access the data stored in the cache 16.

The memory device 20 may include a code section in a predetermined address, and the scratch pad memory 12 may receive a copy of the corresponding code section from the memory device 20 and may store the same. The processor 14 may prefetch an instruction of the copy stored in the scratch pad memory 12 to access the code section according to the predetermined address.

Figure 6:
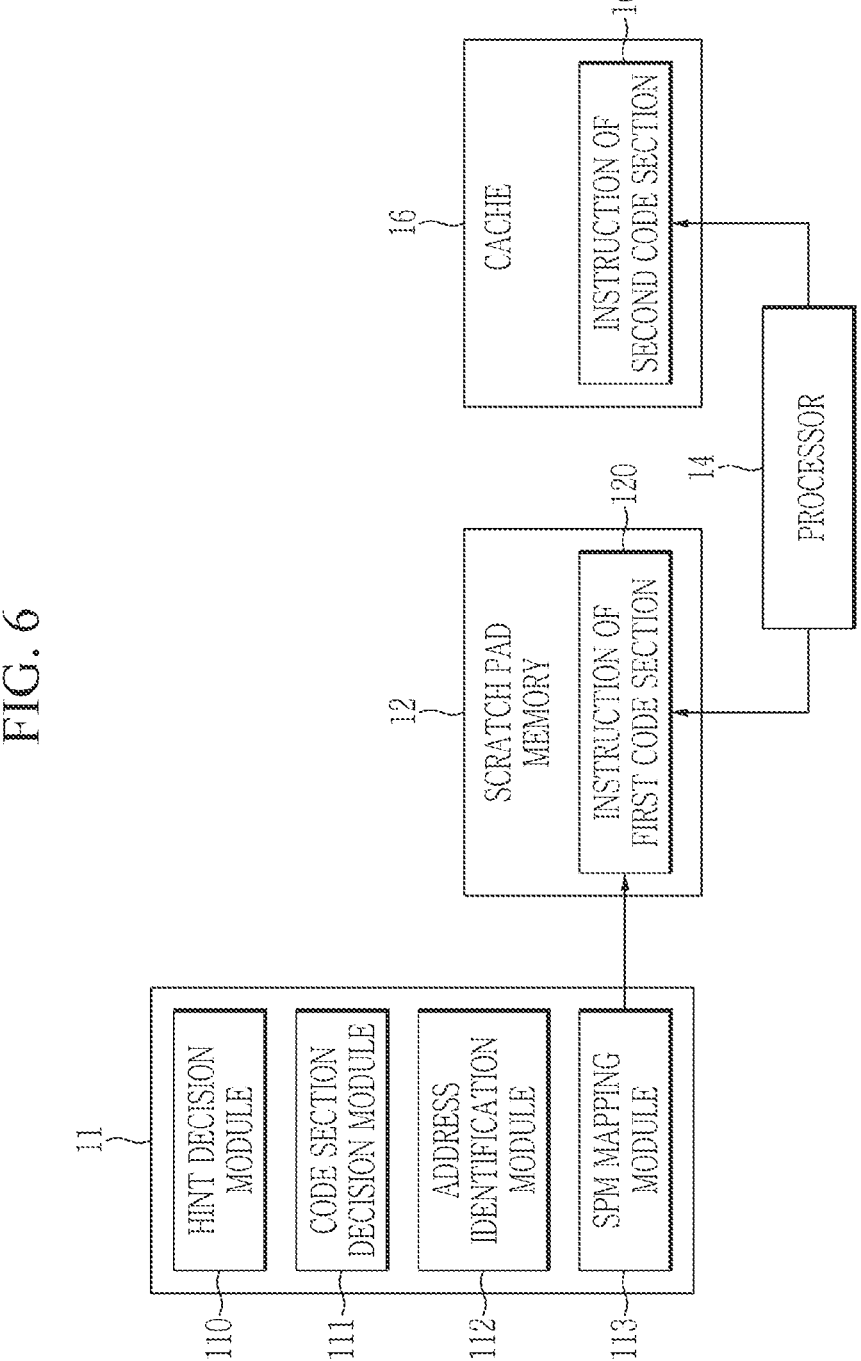
FIG. 6 shows a block diagram for reference in describing an operation of a memory system according to an embodiment.

FIG. 6 shows a block diagram for reference in describing an operation of a memory system according to an embodiment.

As shown in FIG. 1, the code section included in the memory device may include a first code section 21 and a second code section 22. Further, referring to FIG. 6, the scratch pad memory 12 may receive and store the copy of the first code section 21, and the cache 16 may receive and store the copy of the second code section 22. Here, the first code section 21 may correspond to the code section that may have a difficulty in expecting improvement of performance because of the high frequency of generating the compulsory cache miss when using the cache, the low continuity of the code address, and the low spatial locality. On the other hand, the second code section 21 may correspond to the code section that may expect sufficient improvement of performance when using the cache. That is, the scratch pad memory mapping module 113 may duplicate at least one instruction 120 corresponding to the first code section 21 to the scratch pad memory 12 from the memory device 20. The cache 16 may store at least one instruction 160 corresponding to the second code section 22.

The processor 14 may access the scratch pad memory 12 to access the first code section 21, and may access the cache 16 to access the second code section 22.

Figure 7:
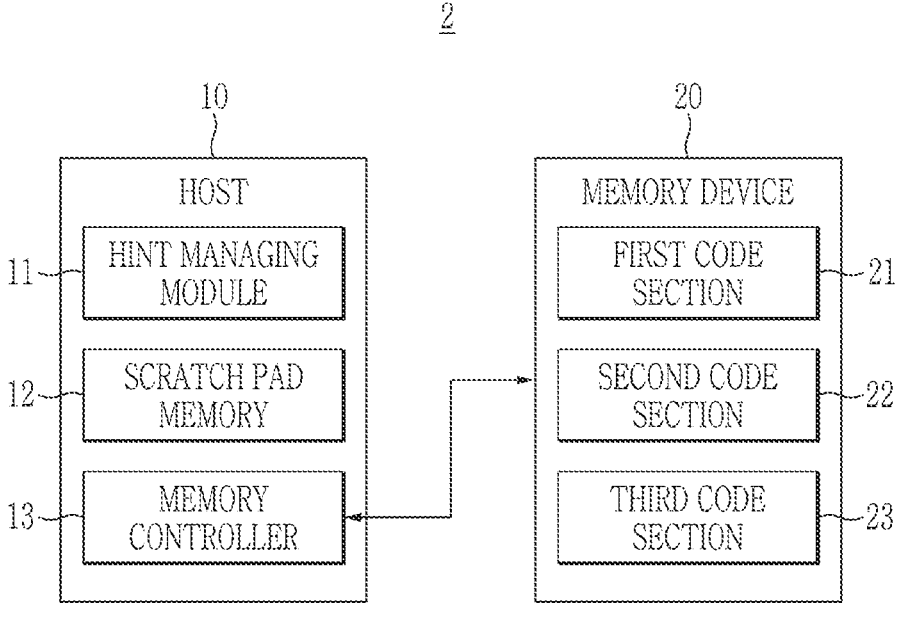
FIG. 7 shows a block diagram of a memory system according to an embodiment.

FIG. 7 shows a block diagram of a memory system according to an embodiment.

Referring to FIG. 7, the memory system 2 differs from that of previous embodiments in that the code section included in the memory device may include a first code section 21, a second code section 22, and a third code section 23. These code sections 21, 22 and 23 are described below in connection with FIG. 8.

Figure 8:
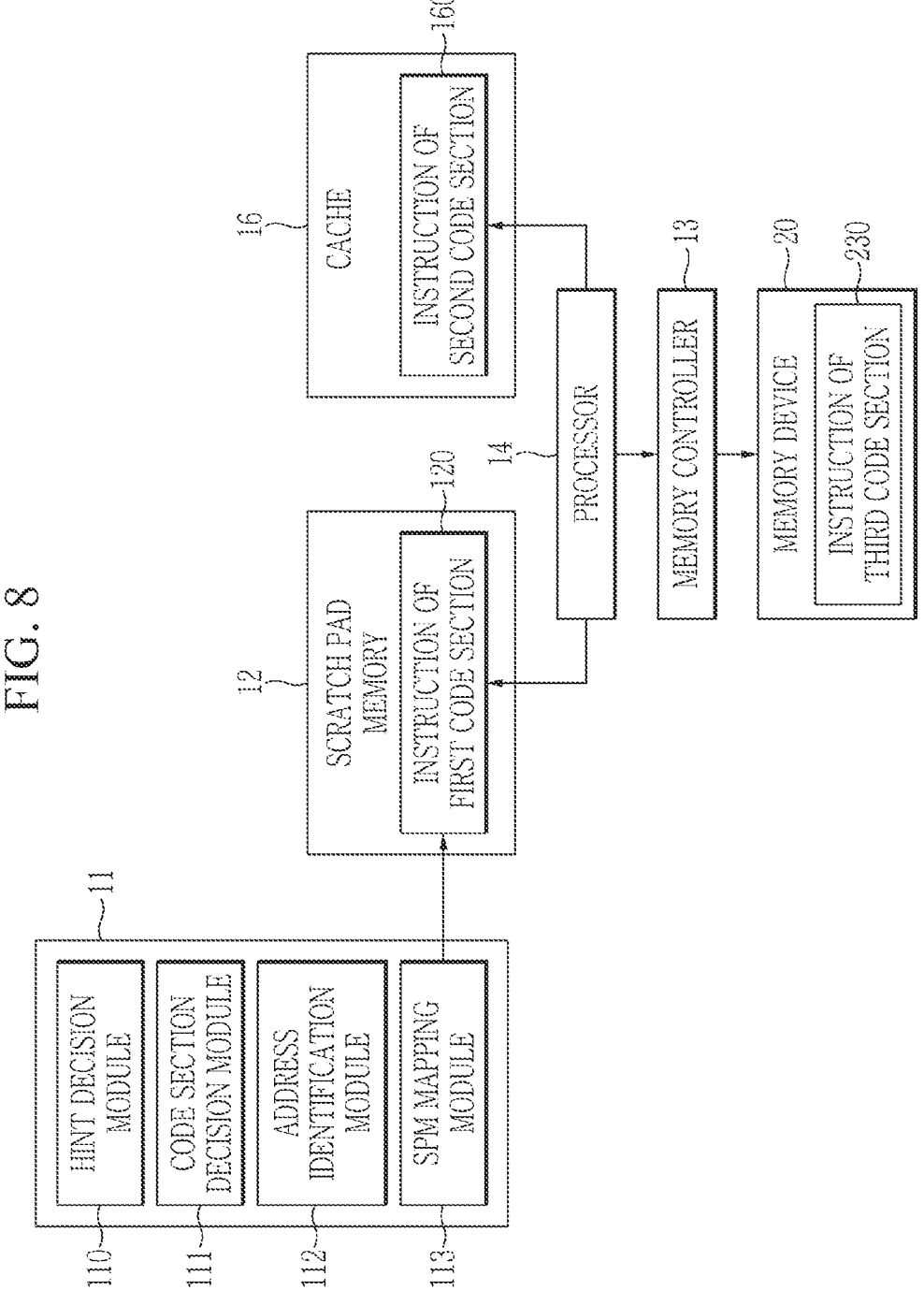
FIG. 8 shows a block diagram for reference in describing an operation of a memory system according to an embodiment.

FIG. 8 shows a block diagram for reference in describing an operation of a memory system of FIG. 7 according to an embodiment.

Referring to FIG. 8, the scratch pad memory 12 may receive and store the copy of the first code section 21, and the cache 16 may receive and store the copy of the second code section 22. Here, the first code section 21 may correspond to the code section that may have a difficulty in expecting improvement of performance because of the high frequency of generating the compulsory cache miss when using the cache, the low continuity of the code address, and the low spatial locality. On the other hand, the second code section 21 may correspond to the code section that may expect sufficient improvement of performance when using the cache. That is, the scratch pad memory mapping module 113 may duplicate at least one instruction 120 corresponding to the first code section 21 to the scratch pad memory 12 from the memory device 20. The cache 16 may store at least one instruction 160 corresponding to the second code section 22.

The processor 14 may access the scratch pad memory 12 to access the first code section 21, may access the cache 16 to access the second code section 22, and may access the memory device 20 to access the third code section 23. That is, the processor 14 may access at least one instruction 230 corresponding to the third code section 23 that is not loaded in the scratch pad memory 12 and the cache 16 from the memory device 20.

According to the above-described embodiments, the code may have difficulty in expecting improvement of performance because of the high frequency of generating the compulsory cache miss when using the cache, the low continuity of the code address, and the low spatial locality, and when the execution frequency is high in a like way of the primitive software for managing the system resource, the performance may be improved by using the scratch pad memory rather than the cache. In detail, the execution time of the corresponding code may be significantly reduced, the IPC may be increased, the memory access latency may be reduced, and the efficiency of power consumption may be increased. For security reasons, the processor may not violate the security policy and may access the instruction stored in the scratch pad memory with a same address by operating the data stored in the scratch pad memory according to an overriding method under a limited condition that the memory address referred to by the executed code may not be randomly changed.

FIG. 9 and FIG. 10 are tables for reference in describing effects generated according to embodiments.

Referring to FIG. 9 and FIG. 10, a specific code section of the scheduler is prefetched to an instruction cache, and ACET (Average Code Execution Time) and IPC (Instruction Per Cycle) are measured. Here, the specific code section selected to prefetch may include a code section that has a substantial influence to the system performance and a significant execution frequency. It is apparent from FIG. 9 that, regarding a result of a control group ("Base") vs. a comparative group ("1$ prefetch"), the ACET is reduced by about 8.6% in "CASE 2". This is because the time used to fetch the instruction through a DRAM access is reduced. As can be seen in FIG. 10, regarding the control group ("Base") vs. the comparative group ("1$ prefetch"), the IPC of "CASE 2" is increased by about 10.7%. This is because the DRAM access latency is reduced, and the number of the instructions executable within a same cycle is increased.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A memory system comprising:
a processor;
a scratch pad memory connected to the processor through an internal bus;
a memory controller connected to the processor through the internal bus, and configured to access a memory device through an external bus in response to a memory access request by the processor; and
a hint managing circuit configured to manage a hint for selecting data to be duplicated in the scratch pad memory from among data loaded in the memory device, wherein the hint includes information characterizing how to select at least one code section, among a plurality of code sections defined in the memory device, to be duplicated in the scratch pad memory based on expected execution characteristics of the at least one code section.

2. The memory system of claim 1, wherein the hint managing circuit includes a hint decision circuit configured to analyze the plurality of code sections defined in the memory device, and to provide the information characterizing how to select the at least one code section as the hint.

3. The memory system of claim 2, wherein the hint managing circuit includes a code section decision circuit configured to decide a code section to be duplicated in the scratch pad memory based on the hint.

4. The memory system of claim 3, wherein the hint managing circuit includes an address identification circuit configured to identify a physical address on the decided code section.

5. The memory system of claim 4, wherein the hint managing circuit includes a scratch pad memory mapping circuit configured to duplicate at least one instruction corresponding to the decided code section to the scratch pad memory from the memory device by using the identified physical address.

6. The memory system of claim 5, wherein the scratch pad memory mapping circuit is configured to map so that the scratch pad memory indicates a code section in the memory device corresponding to the decided code section.

7. The memory system of claim 1, wherein the processor is configured to access data duplicated in the scratch pad memory without an intervention of the memory controller.

8. The memory system of claim 1, wherein the hint is set to select data of which a compulsory cache miss is predicted to be generated beyond a predetermined reference from among the data loaded in the memory device.

9. The memory system of claim 1, wherein the hint is set to select data of which continuity of a code address is predicted to be given below a predetermined reference from among the data loaded in the memory device.

10. The memory system of claim 1, wherein the hint is set to select data of which spatial locality is predicted to be given below a predetermined reference from among the data loaded in the memory device.

11. The memory system of claim 1, wherein the hint indicates that the at least one code section has a higher execution rate in the scratch pad memory than in a cache.

12. A memory system comprising:
a memory device including a code section in a predetermined address;
a scratch pad memory configured to receive and store a copy of at least a portion of the code section from the memory device;
a processor configured to prefetch an instruction of the copy stored in the scratch pad memory so as to access the code section according to the predetermined address; and
a hint managing circuit configured to manage a hint for selecting data to be duplicated in the scratch pad memory from among data loaded in the memory device, wherein the hint includes information characterizing how to select at least one code section, among a plurality of code sections defined in the memory device, to be duplicated in the scratch pad memory based on expected execution characteristics of the at least one code section.

13. The memory system of claim 12, further comprising a cache,
wherein the code section included in the memory device includes a first code section and a second code section, the scratch pad memory receives and stores a copy of the first code section, the cache receives and stores a copy of the second code section, and the processor accesses the scratch pad memory to access the first code section, and accesses the cache to access the second code section.

14. The memory system of claim 13, wherein the code section included in the memory device further includes a third code section, and the processor accesses the memory device to access the third code section.

15. The memory system of claim 13, wherein the processor is connected to the scratch pad memory and the cache through an internal bus, and the processor is connected to the memory device through an external bus.

16. A method for operating a memory system comprising:

analyzing a plurality of code sections defined in a memory device, and providing a hint, wherein the hint includes information characterizing how to select at least one code section, among the plurality of code sections defined in the memory device, to be duplicated in a scratch pad memory based on expected execution characteristics of the at least one code section;

deciding a code section to be duplicated in the scratch pad memory based on the hint;

identifying a physical address on the decided code section;

duplicating at least one instruction corresponding to the decided code section to the scratch pad memory from the memory device by using the identified physical address; and mapping so that the scratch pad memory indicates a code section in the memory device corresponding to the decided code section.

17. The method of claim 16, further comprising prefetching the at least one instruction stored in the scratch pad memory in order for a processor to access the decided code section.

18. The method of claim 16, wherein the hint is set to select data of which a compulsory cache miss is predicted to be generated for more than a predetermined reference from among data loaded in the memory device.

19. The method of claim 16, wherein the hint is set to select data of which continuity of a code address is predicted to be given below a predetermined reference from among data loaded in the memory device.

20. The method of claim 16, wherein the hint is set to select data of which spatial locality is predicted to be given below a predetermined reference from among data loaded in the memory device.

* * * * *